(12) United States Patent
Fong

(10) Patent No.: US 8,010,674 B2
(45) Date of Patent: Aug. 30, 2011

(54) LEARNING AND COMMUNITY-BASED WEB AGGREGATION TECHNIQUES

(75) Inventor: Spencer W. Fong, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 190 days.

(21) Appl. No.: 12/059,696

(22) Filed: Mar. 31, 2008

(65) Prior Publication Data

US 2009/0248789 A1  Oct. 1, 2009

(51) Int. Cl.
*G06F 15/173* (2006.01)

(52) U.S. Cl. ............... 709/226; 709/202; 707/3; 707/10; 707/E17.111; 707/517; 706/12; 715/243

(58) Field of Classification Search .................. 709/226, 709/202; 707/10; 706/12
See application file for complete search history.

(56) References Cited

U.S. PATENT DOCUMENTS

| | | | |
|---|---|---|---|
| 2002/0194226 A1* | 12/2002 | Sheth et al. | 707/517 |
| 2004/0117376 A1* | 6/2004 | Lavin et al. | 707/10 |
| 2007/0067458 A1* | 3/2007 | Chand | 709/226 |
| 2007/0239630 A1* | 10/2007 | Davis et al. | 706/12 |

* cited by examiner

*Primary Examiner* — Kyung-Hye Shin
(74) *Attorney, Agent, or Firm* — Park, Vaughan, Fleming & Dowler LLP; Chia-Hsin Suen

(57) ABSTRACT

Some embodiments of the present invention provide a system that facilitates access to a website from an application. During operation, the system obtains community data associated with interactions between a set of users and the website and examines the community data to identify an interactivity request made by the website to users of the website. Next, the system obtains user-specific data from a new user of the application, which includes a response to the interactivity request from the new user. Finally, the system uses the user-specific data to automate access to the website for the new user.

27 Claims, 3 Drawing Sheets

LEARNING AND COMMUNITY-BASED WEB AGGREGATION TECHNIQUES

RELATED APPLICATION

The subject matter of this application is related to the subject matter in a co-pending non-provisional application by inventors Spencer W. Fong, Richard M. Ng, Thomas E. Dockman, Rodney A. Robinson and Marvin Mah, entitled, "Using Interactive Scripts to Facilitate Web-Based Aggregation," having Ser. No. 11/771,217, and filing date 29 Jun. 2007. The subject matter of this application is also related to the subject matter in a co-pending non-provisional application by inventor Spencer W. Fong, entitled "Using an Interactivity Object to Facilitate Web-Based Aggregation," having Ser. No. 11/779,456 and filing date 18 Jul. 2007.

BACKGROUND

Related Art

The present invention generally relates to systems that automatically aggregate data from websites.

Financial institutions typically provide websites that enable their customers to access account information on-line. Moreover, most people have accounts at a number of different financial institutions. For example, a person might have: (1) bank accounts at a bank, (2) credit-card accounts with different credit-card issuers, and (3) investment accounts with different brokerage firms. This means that the person must visit a number of different websites belonging to different financial institutions to determine their financial position accurately, which is a cumbersome and time-consuming process.

In order to speed up this process, a number of "account aggregation" systems have been developed to compile information from different accounts automatically. To use this type of system, a user typically provides account-access information (such as usernames and passwords) for various accounts, and the account-aggregation system uses this information to gather and compile the account information into a single presentation. These account-aggregation systems typically reside within a web-based application or within client-side software. Note that similar aggregation systems are also used to gather and compile other types of information, such as emails and news articles.

Unfortunately, existing aggregation systems navigate through websites in a programmed fashion that is "static." This means that such systems require data to be already stored (e.g., a username) and also require a website map which is already known. Such systems have problems dealing with "dynamic" situations, where user interaction is required

SUMMARY

Some embodiments of the present invention provide a system that facilitates access to a website from an application. During operation, the system obtains community data associated with interactions between a set of users and the website and examines the community data to identify an interactivity request made by the website to users of the website. Next, the system obtains user-specific data from a new user of the application, which includes a response to the interactivity request from the new user. Finally, the system uses the user-specific data to automate access to the website for the new user.

In some embodiments, the system also determines a set of navigation patterns associated with the website from the community data and uses the navigation patterns to further automate access to the website for the new user.

In some embodiments, access to the website involves: performing navigation operations through webpages in the website; performing parsing operations to extract data from webpages in the website; aggregating content from the website, executing a workflow on the website; or entering information into the website.

In some embodiments, the user-specific data further includes an identifier and a password for the user.

In some embodiments, the interactivity request is associated with at least one of an image, an audio file, a question, a biometric signature, a certificate, a file, a form field, and a token.

In some embodiments, the interactivity request is used to verify an identity of the new user.

In some embodiments, the response to the interactivity request is obtained using an interactivity object.

DETAILED DESCRIPTION

Figure 1:
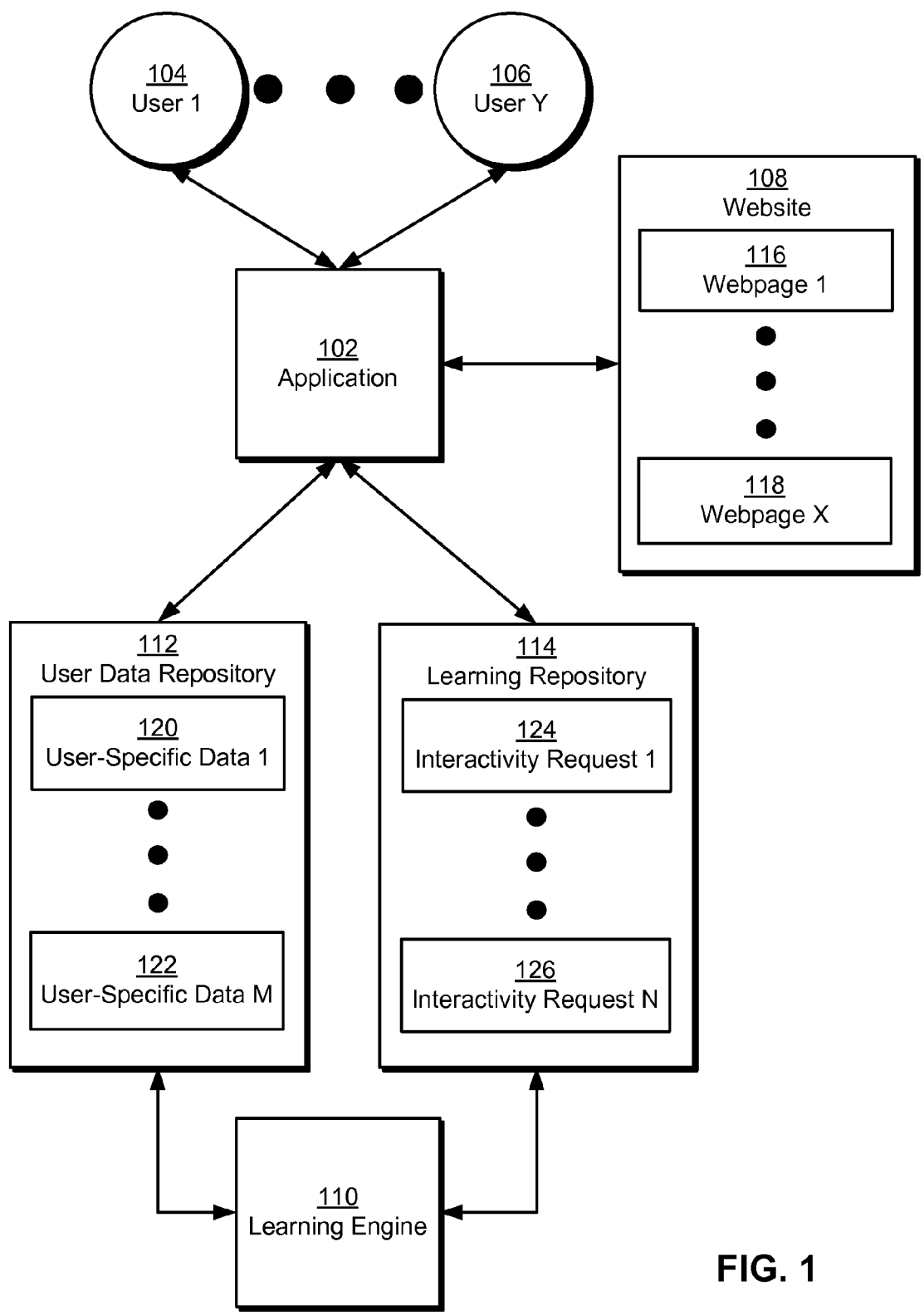
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the invention provide a method and system for facilitating access to a website for a user of the website. The website may correspond to, for example, an electronic commerce (e-commerce) website, a website of a financial institution, and/or another website that requests information from the user. The information requested may include login credentials, personal information, financial information, and/or other user-specific data provided by the user. Furthermore, the website may be accessed from an application that aggregates information from the website and/or performs tasks for the user on the website.

More specifically, embodiments of the invention provide a method and system for automating access to the website for the user. To automate access to the website, community data from other users of the website is used to identify interactivity requests made by the website to the users. In one or more embodiments of the invention, interactivity requests are associated with images, audio files, questions, biometric signatures, certificates, files, form fields, and/or tokens. In other words, interactivity requests may be used to verify an identity of the user and/or obtain input from the user.

Responses to the interactivity requests may then be obtained from the user to automate access to the website by the application. Moreover, the responses may be obtained during the user's setup of the application such that all accesses to the website by the application are automated and the user is no longer queried for responses to interactivity requests.

FIG. 1 shows a schematic of a system in accordance with an embodiment of the present invention. As shown in FIG. 1, the system includes an application 102 that accesses a website 108, a learning engine 110, a user data repository 112, and a learning repository 114. Each of these components is described in detail below.

Website 108 may correspond to a collection of webpages (e.g., webpage 1 116, webpage x 118) that are accessed by multiple users (e.g., user 1 104, user y 106). The webpages may be retrieved and viewed by the users through a web browser and network connection. Furthermore, website 108 may include one or more dynamic webpages (e.g., webpage 1 116, webpage x 118) that interact with the users through client-side scripting and/or server-side scripting techniques. For example, website 108 may provide access to financial accounts and transactions, electronic commerce (e-commerce) services, games, discussion boards, email services, search services, customer relationship management (CRM) services, and/or other types of web applications to the users.

To interact with the users, website 108 may request input and provide output through one or more webpages (e.g., webpage 1 116, webpage x 118). For example, a webpage on a search engine may include form fields for obtaining search terms as input from users. The search engine may then process the search terms and display links (e.g., hyperlinks, pointers, references, etc.) to websites, documents, and/or media matching the search terms as output to the users.

Similarly, website 108 may include security mechanisms that require the users to authenticate themselves before accessing one or more features of website 108. More specifically, website 108 may include a login webpage with form fields that request an identifier (i.e., login) and password from a user. If the identifier and password are recognized by website 108, the user may be allowed to access other sections (e.g., webpages) of website 108. For example, the user may supply a login and a password to a website for a financial institution to gain access to the user's accounts with the financial institution and perform financial transactions using the accounts.

In addition, website 108 may use multiple authentication factors to verify the identity of a user. For example, website 108 may request that the user provide answers to security questions, select a previously chosen image, enter a cryptographic key, provide a biometric signature, and/or enter additional input to authenticate himself or herself. Each user may also be required to provide a different combination of authentication factors. For example, one user may be required to provide a login, password, and an answer to a security question, whereas another user may be required to provide a login, password, and a cryptographic key. As a result, website 108 may request different types of input from different users to perform the same task for each user.

In one or more embodiments of the invention, input to website 108 is provided by application 102 on behalf of the users. In other words, user interaction with website 108 may be partially or fully automated by application 102. More specifically, application 102 may: perform navigation operations through webpages in website 108; perform parsing operations to extract data from webpages in website 108; aggregate content from website 108; execute a workflow on website 108; and/or enter information into website 108 for the users.

For example, application 102 may be an accounting application that aggregates financial account information from websites for financial institutions, such as banks, brokerages, and/or credit card companies. To aggregate content from website 108, application 102 may obtain an identifier, password, and/or other authentication factors from the user and supply the authentication factors to website 108. Once application 102 is logged in as the user, application 102 may aggregate information from website 108 by navigating and parsing the webpages of website 108. Application 102 may also automate tasks such as transferring funds or paying bills for the user by providing input that carries out the tasks to website 108.

In one or more embodiments of the invention, application 102 uses a script to access website 108. Website access using scripts is described in a co-pending non-provisional application by inventors Spencer W. Fong, Richard M. Ng, Thomas E. Dockman, Rodney A. Robinson and Marvin Mah, entitled, "Using Interactive Scripts to Facilitate Web-Based Aggregation," having Ser. No. 11/771,217, and filing date 29 Jun. 2007, which is incorporated herein by reference.

In one or more embodiments of the invention, application 102 interacts with website 108 by providing user-specific data (e.g., user-specific data 1 120, user-specific data m 122) as input to website 108. In one or more embodiments of the invention, the user-specific data includes information that allows application 102 to access to website 108 for a user. For example, the user-specific data may include the user's login, password, and/or other authentication factors, as well as additional information and/or data that may be used by application 102 to automate tasks for the user.

The user-specific data may be obtained from the user and/or aggregated from other sources, such as documents and other websites. Once obtained, the user-specific data may be stored in user data repository 112 for future retrieval and use by application 102. For example, an investment application may access a website for a stock brokerage using a login and password obtained from a user of the investment application and website. The investment application may then perform stock trades on the website using preferences from the user, investment models stored in a database, and/or stock and index data obtained from stock exchange servers. Finally, the investment application may store the login credentials, preferences, and links to the investment models in a repository (e.g., user data repository 112) for subsequent retrieval so that the investment application may continue managing the user's investments on the brokerage website.

In one or more embodiments of the invention, user-specific data is provided to website 108 by application 102 upon receiving an interactivity request (e.g., interactivity request 1 124, interactivity request n 126) from website 108. In one or more embodiments of the invention, interactivity requests correspond to requests for user input from website 108. Interactivity requests may be provided by website 108 using form fields, buttons, menus, checkboxes, radio boxes, and/or other input mechanisms. For example, website 108 may use form fields to request a login and password, a virtual keyboard to request an additional security key, and/or a calendar widget to request a date from a user.

In one or more embodiments of the invention, application 102 uses an interactivity object to present an interactivity request to a user and obtain a response to the interactivity request from the user. Interactivity objects are described in a co-pending non-provisional application by inventor Spencer W. Fong, entitled "Using an Interactivity Object to Facilitate Web-Based Aggregation," having Ser. No. 11/779,456 and filing date 18 Jul. 2007, which is incorporated herein by reference.

Those skilled in the art will appreciate that user-specific data may be obtained from users at various times. For example, application 102 may send interactivity requests to users as the interactivity requests are received from website 108. User responses to the interactivity requests may then be sent from application 102 to website 108 to access website 108 on the users' behalf. Moreover, the user responses may be stored in user data repository 112 for future retrieval by application 102, thus allowing application 102 to automate future accesses to website 108.

Furthermore, interactivity requests encountered by application 102 may be used to facilitate access to website 108 for newer users of application 102. In other words, a model of user interaction with website 108 may be built by learning engine 110 from interactivity requests encountered by application 102 while accessing website 108. The model may then be used by application 102 to facilitate access to website 108 for a new user of application 102, as explained below.

In one or more embodiments of the invention, learning engine 110 examines community data which includes user-specific data from multiple users (e.g., user 1 104, user y 106) of website 108. More specifically, learning engine 110 may analyze the community data for interactivity requests (e.g., interactivity request 1 124, interactivity request n 126) found in various webpages (e.g., webpage 1 116, webpage x 118) of website 108. Interactivity requests found by learning engine 110 may then be stored in learning repository 114 and used by application 102 to obtain responses to one or more interactivity requests from a new user, which may in turn be stored in user data repository 112. Application 102 may then retrieve the responses as user-specific data to automate access to website 108 for the new user. In other words, previously encountered interactivity requests are presented to new users prior to accessing website 108 for the new users to facilitate automatically accessing website 108 on behalf of the new users.

For example, website 108 may request a login, password, and security question as authentication factors from each user of website 108. Application 102 may encounter the security question when attempting to access website 108 with a user's login and password. Next, application 102 may obtain an answer to the security question from the user and provide the answer to website 108. Application 102 may then gain access to website 108 if the answer matches an answer obtained from the user by website 108. Furthermore, the security question and/or answer may be stored in user data repository 112 as user-specific data to facilitate future accesses to website 108 by application 102. Finally, the user-specific data may be analyzed by learning engine 110 to determine the types of interactivity requests encountered by users of website 108, such as the security question. The security question and/or other interactivity requests may then be stored in learning repository 114 and used by application 102 to obtain responses from new users of application 102 prior to accessing website 108 for the new users, thus automating access to website 108 for the new users.

Furthermore, learning engine 110 may analyze community data from user data repository 112 to determine patterns in interactivity requests to users from website 108. In particular, learning engine 110 may determine navigation patterns by various users of website 108 from the community data. These navigation patterns may correspond to different uses of website 108, different types of user accounts with website 108, different authentication methods used by website 108, and/or other factors that influence user interaction with website 108. For example, authentication factors may be requested by website 108 based on the type of account a user has with website 108; an account with more features and/or privileges may include cryptographic keys, biometric signatures, and/or other sophisticated authentication methods, while an account with basic access privileges may include security questions, image recognition, and/or other basic authentication methods.

These navigation patterns may be stored in learning repository 114 by learning engine 110 and further used to automate access to website 108 for new users of application 102. To automate access for a new user, application 102 may obtain initial user-specific data from the new user, such as the new user's account type(s), location, age, and/or other personal information. Application 102 may then determine a set of interactivity requests that are likely to be asked of the new user based on the user-specific data and obtain responses to interactivity requests from the new user prior to accessing website 108 for the new user. In other words, all user input associated with accessing website 108 may be obtained from the new user during setup of application 102 for the new user.

For example, website 108 may use three different sets of authentication factors to implement three different security levels for users. After user-specific data associated with each set of authentication factors is collected from users of website 108, learning engine 110 may use techniques such as inference rules, heuristics, Bayesian networks, neural networks, and/or Markov models to examine the user-specific data as community data to determine patterns of user interaction with website 108. Each set of authentication factors, as well as types of user-specific data (e.g., account type, security level, etc.) associated with each set of authentication factors, may then be stored in learning repository 114 by learning engine 110. Once a particular set of authentication factors is deemed relevant to a new user based on user-specific data obtained from the new user, application 102 may obtain the authentication factors from the new user and use the authentication factors to automate access to website 108 for the new user.

Figure 2:
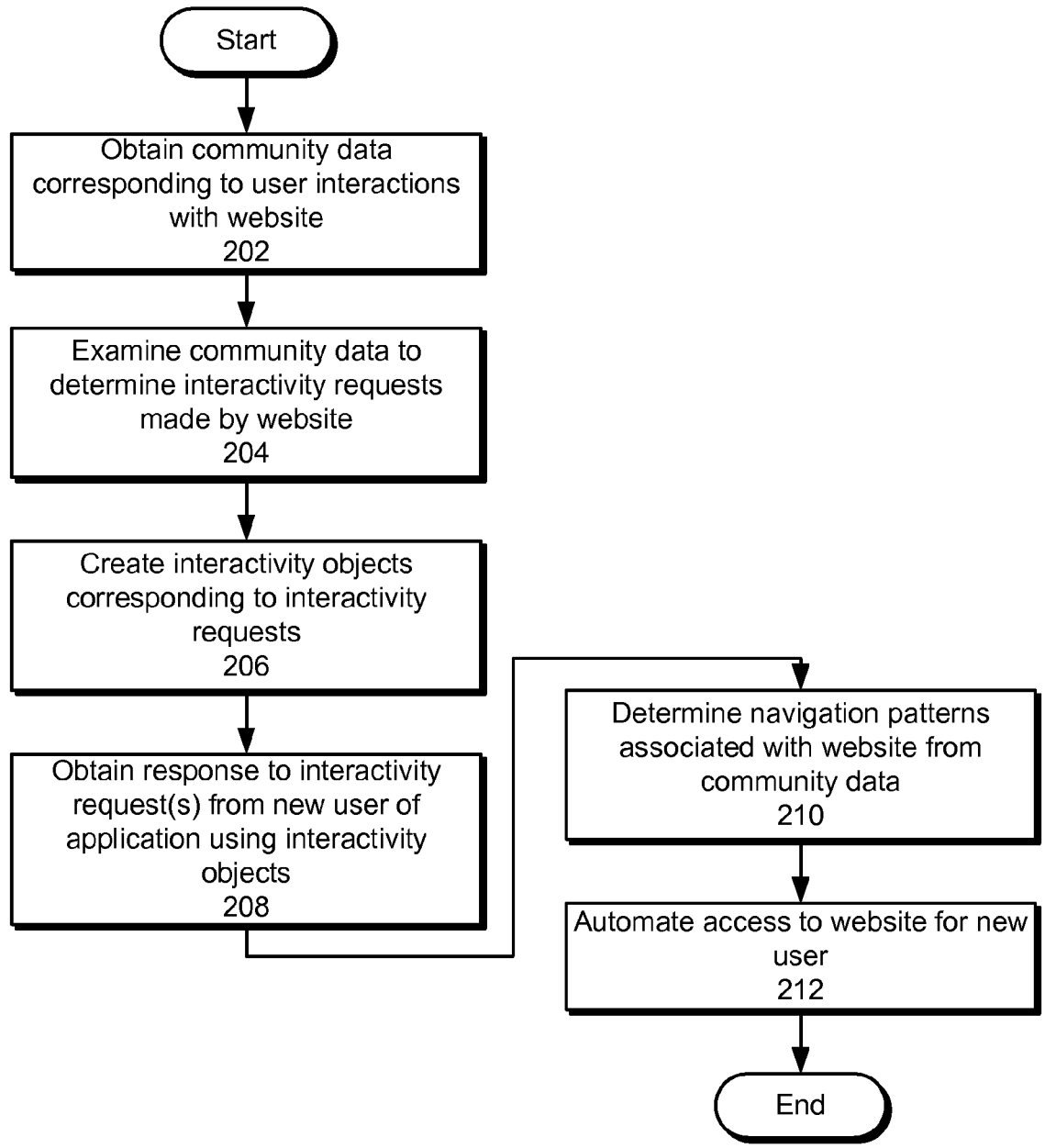
FIG. 2 shows a flowchart illustrating the process of facilitating access to a website in accordance with an embodiment of the present invention.

FIG. 2 shows a flowchart illustrating the process of facilitating access to a website in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, community data corresponding to user interactions with the website is obtained (operation 202). The community data may be stored in a repository, such as user data repository 112 of FIG. 1. Furthermore, the community data may include user-specific data for each user of the website, such as the user's login credentials, authentication factors, and/or other information associated with access to the website by the user.

Next, the community data is examined to determine a set of interactivity requests made by the website (operation 204). The interactivity requests may correspond to requests for user input, such as a login and password, personal information, and/or user preferences. Interactivity objects corresponding to the interactivity requests are then created (operation 206) and used to obtain responses to the interactivity requests from a new user of the application (operation 208).

Navigation patterns associated with the website are also determined from the community data (operation 210). For example, the website may be associated with certain usage contexts that are based on the types of accounts users have with the website, the tasks performed on the website by the users, and/or the levels of authentication required to access the website by the users. The navigation patterns and the responses to interactivity requests may then be used to automate access to the website for the new user (operation 212). As described above, automated access to the website may include performing navigation operations through webpages in the website, performing parsing operations to extract data from webpages in the website, aggregating content from the website, executing a workflow on the website, and/or entering information into the website for the users.

Figure 3:
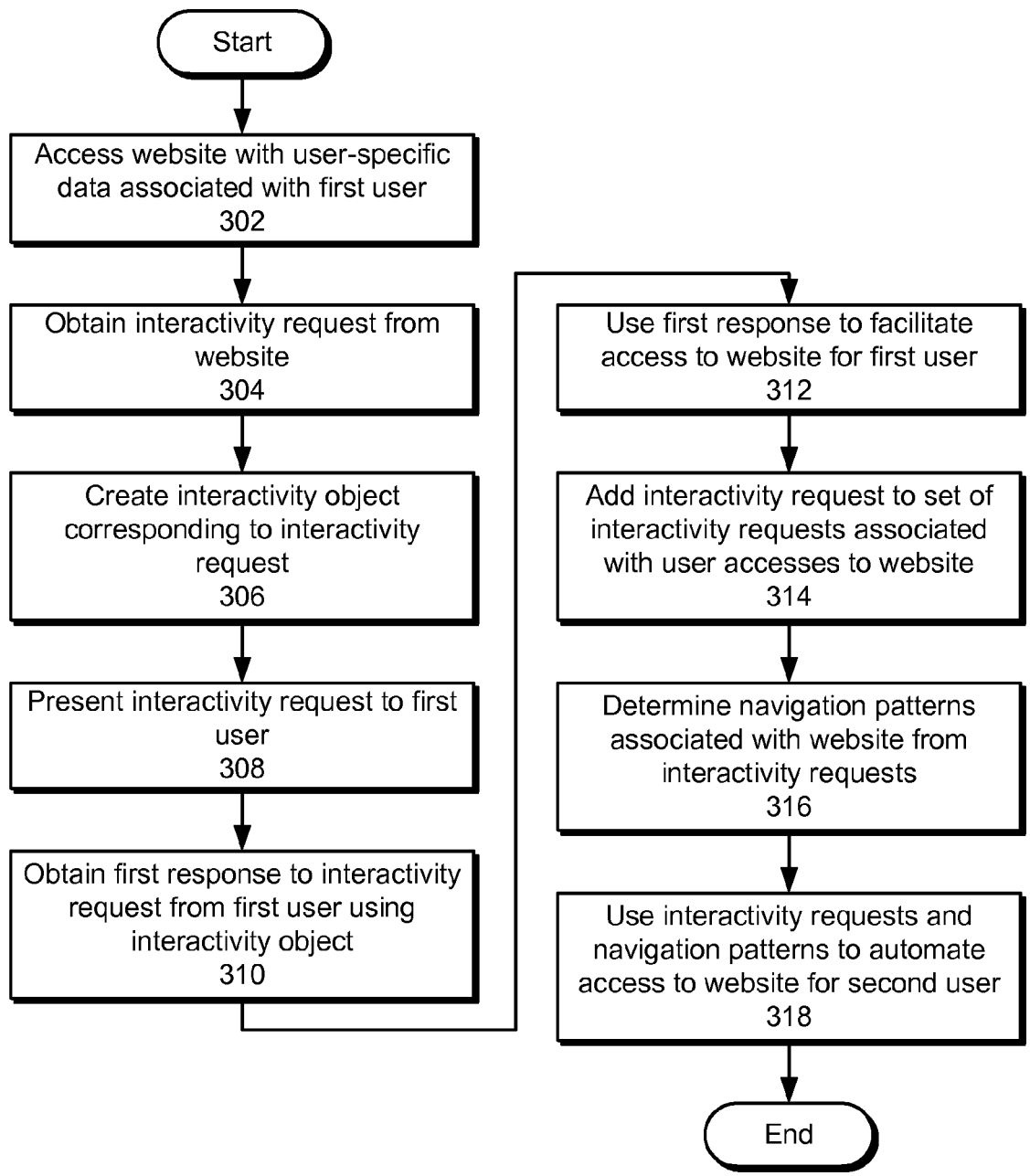
FIG. 3 shows a flowchart illustrating the process of facilitating access to a website in accordance with an embodiment of the present invention.

FIG. 3 shows a flowchart illustrating the process of facilitating access to a website in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, the website is accessed with user-specific data associated with a first user (operation 302). For example, the first user's login and password may be provided to the website to access the user's accounts on the website. Next, an interactivity request is obtained from the website (operation 304). The interactivity request may be associated with an image, an audio file, a question, a biometric signature, a certificate, a file, a form field, and/or a token. For example, the interactivity request may correspond to a security question for authenticating the user or a request for a user preference.

An interactivity object corresponding to the interactivity request is created (operation 306) and used to present the interactivity request to the first user (operation 308). A response to the interactivity request is obtained using the interactivity object from the first user (operation 310) and used to facilitate access to the website for the first user (operation 312). For example, the first user may provide an answer to a security question to enable access to the website.

Next, the interactivity request is added to a set of interactivity requests associated with user accesses to the website (operation 314). For example, a security question may be added to a list of security questions used by the website to authenticate users. The set of interactivity requests are then used to determine a set of navigation patterns associated with the website (operation 316). In other words, a model of user interaction with the website may be developed by examining the interactivity requests. The model is then used to automate access to the website for a second user (operation 318). For example, the second user may be asked to provide an answer to a security question discovered during access to the website for the first user. The second user's answer may then be used to automate all accesses to the website for the second user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automating access to a website, wherein the website is accessed by an application on behalf of a user of the application, comprising:
   obtaining community data associated with interactions between a set of users and the website;
   analyzing the community data to identify an interactivity request made by the website to a first user in the set of users of the website, wherein the interactivity request is a request from the website for user-specific data that is required to allow the first user to access the website;
   storing, in a repository, the interactivity request made by the website;
   acquiring user-specific data from a second user for accessing the website, based on the stored interactivity requests from the set of first users, wherein said acquiring occurs prior to the second user accessing the website; and
   using the user-specific data to automate access to the website for the second user.

2. The method of claim 1, further comprising:
   determining a set of navigation patterns associated with the website from the community data; and
   using the navigation patterns to further automate access to the website for the second user.

3. The method of claim 2, wherein access to the website involves at least one of:
   performing navigation operations through webpages in the website;
   performing parsing operations to extract data from webpages in the website;
   aggregating content from the website;
   executing a workflow on the website; and
   entering information into the website.

4. The method of claim 1, wherein the user-specific data further comprises an identifier and a password for the user.

5. The method of claim 1, wherein the interactivity request is associated with at least one of an image, an audio file, a question, a biometric signature, a certificate, a file, a form field, and a token.

6. The method of claim 1, wherein the interactivity request is used to verify an identity of the first user.

7. The method of claim 1, wherein the response to the interactivity request is obtained using an interactivity object.

8. A method for automating access to a website, comprising:
   accessing the website with user-specific data associated with a first user of the website;
   obtaining, from the website, an interactivity request for the first user wherein the interactivity request is a request from the website for user-specific data that is required to allow the first user to access the website;
   presenting the interactivity request to the first user;

obtaining a first response to the interactivity request from the first user;

using the first response to access the website for the first user;

adding the interactivity request obtained from the website for the first user to a set of interactivity request associated with user accesses to the website; and using the interactivity request obtained from the website for the first user to facilitate access to the website for a second user of the website, which involves using the interactivity request to obtain user-specific data from the second user prior to the second user accessing the website.

9. The method of claim 8, wherein access to the website is facilitated for the second user by:

presenting the interactivity request to the second user;

obtaining a second response to the interactivity request from the second user; and using the second response to the interactivity request to automate access to the website for the second user.

10. The method of claim 8, further comprising:

determining a set of navigation patterns associated with the website by analyzing the set of interactivity requests; and using the navigation patterns to further facilitate access to the website for the second user.

11. The method of claim 10, wherein access to the website involves at least one of:

performing navigation operations through webpages in the website;

performing parsing operations to extract data from webpages in the website;

aggregating content from the website;

executing a workflow on the website; and entering information into the website.

12. The method of claim 8, wherein the interactivity request is associated with at least one of an image, an audio file, a question, a biometric signature, a certificate, a file, a form field, and a token.

13. The method of claim 8, wherein the response to the interactivity request is obtained using an interactivity object.

14. A system that automates access to a website, wherein the website is accessed by an application on behalf of a user of the application, comprising:

a processor;

a memory associated with the processor;

a user data repository comprising community data associated with interactions between a set of users and the website;

a learning engine configured to analyze the community data to identify an interactivity request made by the website to the set of users of the website, wherein the interactivity request is a request from the website for user-specific data that is required to allow the first user to access the website;

a learning repository configured to store the identified interactivity request made by the website; and an application configured to:

prior to the second user accessing the website, acquire user-specific data from the second user for accessing the website, based on the stored interactivity requests from the set of users; and use the response to the interactivity request to automate access to the website for the second user.

15. The system of claim 14, further comprising:

the learning repository further configured to store a set of interactivity requests associated with user accesses to the website, wherein the learning engine is further configured to:

add the interactivity request to the set of interactivity requests; and use the set of interactivity requests to determine a set of navigation patterns associated with the website, and wherein the application is further configured to use the navigation patterns to automate access to the website for the second user.

16. The system of claim 15, wherein access to the website involves at least one of:

performing navigation operations through webpages in the website;

performing parsing operations to extract data from webpages in the website;

aggregating content from the website;

executing a workflow on the website; and entering information into the website.

17. The system of claim 14, wherein the user-specific data acquired from the second user comprises an identifier and a password for the second user.

18. The system of claim 14, wherein the interactivity request is associated with at least one of an image, an audio file, a question, a biometric signature, a certificate, a file, a form field, and a token.

19. The system of claim 14, wherein the interactivity request is used to verify an identity of the first user.

20. The system of claim 14, wherein the response to the interactivity request is obtained using an interactivity object.

21. A non-transitory computer-readable storage medium storing instructions that when executed by a computer cause the computer to perform a method for automating access to a website, wherein the website is accessed by an application on behalf of a user of the application, comprising:

obtaining community data associated with interactions between a set of users and the website;

analyzing the community data to identify an interactivity request made by the website to a first user in the set of users of the website, wherein the interactivity request is a request from the website for user-specific data that is required to allow the first user to access the website;

storing, in a repository, the interactivity request made by the website;

acquiring user-specific data from a second user for accessing the website, based on the stored interactivity requests from the set of first users, wherein said acquiring occurs prior to the second user accessing the website; and using the user-specific data to automate access to the website for the second user.

22. The non-transitory computer-readable storage medium of claim 21, the method further comprising:

determining a set of navigation patterns associated with the website from the community data; and using the navigation patterns to further automate access to the website for the second user.

23. The non-transitory computer-readable storage medium of claim 22, wherein access to the website involves at least one of:

performing navigation operations through webpages in the website;

performing parsing operations to extract data from webpages in the website;

aggregating account information from the website;

executing a workflow on the website; and
entering information into the website.

24. The non-transitory computer-readable storage medium of claim 21, wherein the user-specific data acquired from the second user comprises an identifier and a password for the second user.

25. The non-transitory computer-readable storage medium of claim 21, wherein the interactivity request is associated with at least one of an image, an audio file, a question, a biometric signature, a certificate, a file, a form field, and a token.

26. The non-transitory computer-readable storage medium of claim 21, wherein the interactivity request is used to verify an identity of the first user.

27. The non-transitory computer-readable storage medium of claim 21, wherein the response to the interactivity request is obtained using an interactivity object.

* * * * *